United States Patent
Jung

(10) Patent No.: US 9,160,348 B2
(45) Date of Patent: Oct. 13, 2015

(54) APPARATUS AND METHOD TO UPDATE A DEFAULT TIME INTERVAL BASED ON PROCESS CORNER, TEMPERATURE AND VOLTAGE

(75) Inventor: Hwisung Jung, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 523 days.

(21) Appl. No.: 13/303,922

(22) Filed: Nov. 23, 2011

(65) Prior Publication Data

US 2013/0047012 A1 Feb. 21, 2013

Related U.S. Application Data

(60) Provisional application No. 61/524,538, filed on Aug. 17, 2011.

(51) Int. Cl.

| | |
|---|---|
| G06F 1/26 | (2006.01) |
| G06F 1/32 | (2006.01) |
| H03L 7/08 | (2006.01) |
| H03K 3/03 | (2006.01) |
| H03K 3/037 | (2006.01) |
| H03K 19/01 | (2006.01) |
| G06F 12/14 | (2006.01) |
| G06F 21/44 | (2013.01) |
| H03K 5/13 | (2014.01) |
| H03L 7/097 | (2006.01) |
| H03L 7/099 | (2006.01) |
| H03K 5/00 | (2006.01) |

(52) U.S. Cl.
CPC ................ *H03L 7/0802* (2013.01); *G06F 1/32* (2013.01); *G06F 12/14* (2013.01); *G06F 21/44* (2013.01); *H03K 3/0315* (2013.01); *H03K 3/0375* (2013.01); *H03K 5/133* (2013.01); *H03K 19/01* (2013.01); *H03L 7/097* (2013.01); *H03L 7/0997* (2013.01); *G06F 1/26* (2013.01); *G06F 1/3203* (2013.01); *G06F 1/3228* (2013.01); *H01L 2924/0002* (2013.01); *H03K 2005/00026* (2013.01); *H03K 2005/00058* (2013.01)

(58) Field of Classification Search
CPC ........ G06F 1/3203; G06F 1/26; G06F 1/3228
USPC .......................................................... 713/320
See application file for complete search history.

(56) References Cited

U.S. PATENT DOCUMENTS

| | | | |
|---|---|---|---|
| 2008/0307240 A1* | 12/2008 | Dahan et al. ................... | 713/320 |
| 2009/0049314 A1* | 2/2009 | Taha et al. ...................... | 713/300 |
| 2011/0173474 A1* | 7/2011 | Salsbery et al. .............. | 713/323 |

FOREIGN PATENT DOCUMENTS

WO   WO 2007090431 A1 *  8/2007   ..................... 713/323

OTHER PUBLICATIONS

Edward T.-H. Chu • Tai-Yi Huang • Cheng-Han Tsai • Jian-Jia Chen •Tei-Wei Kuo, A DVS-assisted hard real-time I/O device scheduling algorithm, Feb. 12, 2009, Real-time systems.*

* cited by examiner

*Primary Examiner* — Jaweed A Abbaszadeh
*Assistant Examiner* — Gayathri Sampath
(74) *Attorney, Agent, or Firm* — Sterne, Kessler, Goldstein & Fox PLLC

(57) ABSTRACT

A processor arrangement changes its default time interval for entering a power saving mode based on sensed operating conditions and predetermined time intervals to be used under various operating conditions to optimize power saving.

20 Claims, 4 Drawing Sheets

APPARATUS AND METHOD TO UPDATE A DEFAULT TIME INTERVAL BASED ON PROCESS CORNER, TEMPERATURE AND VOLTAGE

CROSS REFERENCE TO RELATED APPLICATIONS

This patent application claims the benefit of U.S. Provisional Patent Application No. 61/524,538, filed Aug. 17, 2011, entitled "Power Management Unit," which is incorporated herein by reference in its entirety.

BACKGROUND OF THE INVENTION

1. Field of the Invention

The present invention relates to adaptively scaling parameters which are used by a processor to enter a low power mode. The inventive adaptive scaling technique assists in optimizing the total power consumption of the processor.

2. Background Art

A processor enters a low power mode to save power based on a duration of its operating state being idle. In particular, when the processor expects to remain idle for a duration less than a fixed "break-even" time, the processor enters a wait-for-interrupt (WFI) mode to save power. Alternatively, when the processor expects to remain idle for a duration greater than the fixed break-even time, the processor enters a dormant mode to save additional power. The break-even time is the minimum duration of idle time required to elapse before the processor can enter the dormant mode.

Different techniques are used to save power in the above-mentioned low power modes. For example, in the WFI mode, the power required to switch components of the processor is reduced by clocking the gates of the switching components. Further, in the dormant mode, in addition to clocking the gates of the switching components, leakage currents are reduced by turning off certain components (e.g., SRAM memory) supported by the processor to save leakage power. Therefore, there are additional power savings in the dormant mode than in the WFI mode. However, there is a greater latency associated with transitioning from the dormant mode to the active (non-idle) mode than a latency associated with transitioning from the WFI mode to the active mode because more energy (power) is required to transition from the dormant mode to the active mode than is required to transition from the WFI mode to the active mode. This is because the components (e.g., SRAM memory) that were turned off need to be woken up and registers associated with turned off components need to be restored. If the processor enters the dormant mode when it expects to remain idle for a duration less than the fixed break-even time, there is a penalty, in terms of power loss, to a transition out of the dormant mode.

In summary, the processor enters the WFI mode or the dormant mode to save power based on the duration of the break-even time. In conventional systems, the duration of the break-even time is fixed. That is, in operation, the duration of the break-even time cannot be changed or updated to adjust according to operation parameters of the processor. This is undesirable. Further, the duration of break-even time is conventionally fixed based on the worst-case conditions of operating voltage, operating temperature, and the process corner within which the processor is designated to operate. However, such a fixing of the duration of break-even time is inefficient and does not provide optimum power savings.

Accordingly, there is a need for the duration of the break-even time to be adjustable during operation of the processor to provide optimum power savings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
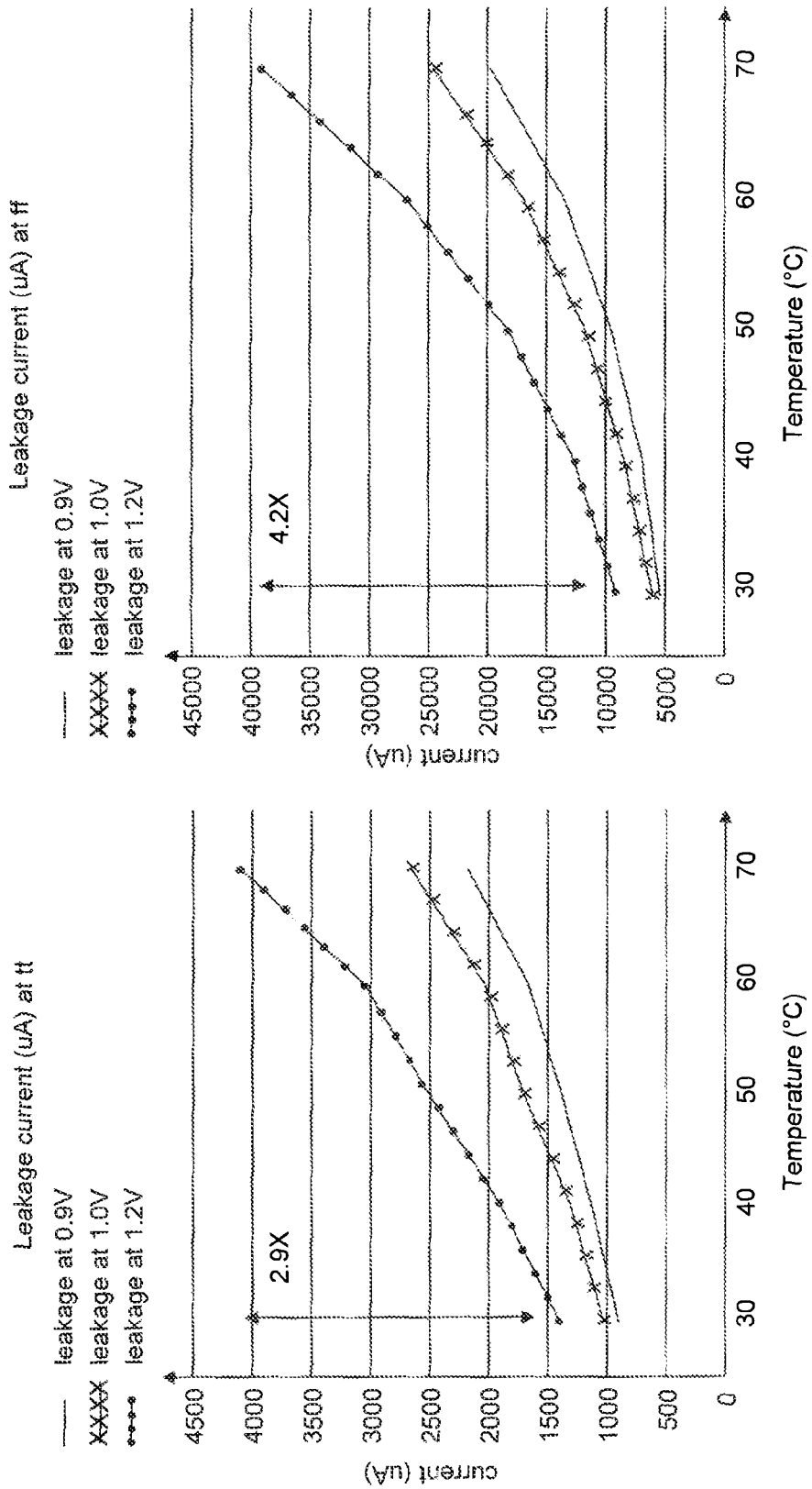
FIG. 1 illustrates the variation in leakage currents at different operating voltages and different temperatures between two process corners.

As described above, it is known to use a fixed and non-adjustable break-even time to control when a processor changes operating mode to a power saving mode. This invention departs from that known design criteria and provides for scaling of the duration of the break-even time to provide optimum power savings under various circumstances. Applicant has recognized that the energy (power) lost in the form of leakage current is based on process corners of the processor. There are three process corners. They are ss-slow slow; tt-typical typical; and ff-fast fast. Further, Applicant has realized that the leakage currents at different operating voltages vary at different temperatures among the different process corners. For instance, FIG. 1 illustrates the variation in leakage currents at different operating voltages at different temperatures between the tt and ff process corners. As graphically depicted, leakage currents at different operating voltages (0.9V, 1.0V, 1.2V) vary at different temperatures (0-70° C.) between process corners (tt and ff). The leakage currents are higher for process corner ff with respect to leakage currents for process corner tt under similar processor operating conditions. Further, as seen in FIG. 1, the variance in the leakage currents for tt process corner (2.9×) and for ff process corner (4.2×) is different when operating voltages are constant but the operating temperature varies, and vice versa. Applicant has recognized these variances in the leakage currents which are based on the operating voltage, operating temperature, and the process corner within which the processor operates. Based on this recognition, Applicant has concluded that it is not optimum to make the break-even time a fixed duration. Rather, as described in this patent document, the duration of the break-even time should be scaled in accordance with changes in operating parameters of the processor.

The problem associated with a fixed duration of break-even time will now be discussed in brief. Typically, the duration of the break-even time is fixed based on worst-case operating parameters of the processor. This fixed duration applies to the processor at all times and under all operating conditions. This is undesirable because the fixed duration of the break-even time fails to provide optimum power savings.

For example, assume that the duration of the break-even time is fixed to be 10 ms. Further, assume that the processor is operating at a temperature of 30° C. and at 0.9V, and with an expected idle time of 8 ms. Under typical conditions, the processor does not enter the dormant mode.

Applicant has realized that additional power savings can be obtained if the fixed duration of the break-even time is scaled to be, for example, 1.5 ms based on the operating conditions of 30° C. at 0.9V. The value of 1.5 ms is calculated based on the operations of the processor under the operating conditions of 30° C. at 0.9V for a given process corner. One will appreciate that, under the above conditions, the processor will enter the dormant mode after 1.5 ms of idle time, and, therefore, enable optimum power savings. In this way, different values of the duration of the break-even time can be calculated based on different operating conditions of the processor, and even during operation, these values can be dynamically selected to apply based on measured operating conditions.

An embodiment of the invention utilizes different break-even time durations that are pre-calculated and pre-stored in a look-up table. During operation, operating conditions (voltage, temperature) are continuously measured, and an appropriate pre-calculated value of the duration of the break-even time is selected to be applied dynamically. When conditions change, a different pre-calculated value of the duration of the break-even time can be selected and utilized. Such a configuration enables optimum power savings.

Figure 2:
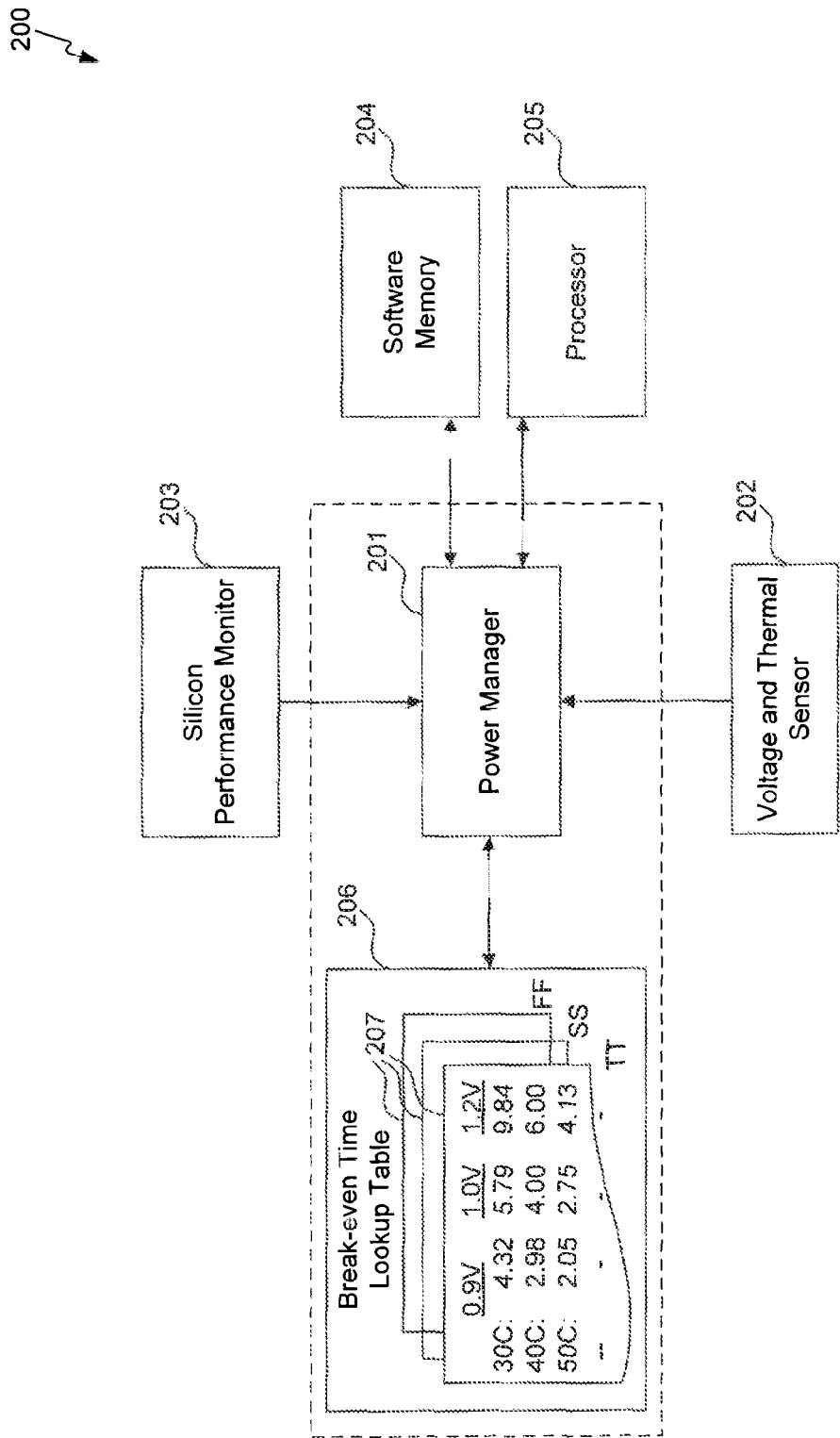
FIG. 2 illustrates an exemplary semiconductor device according to an embodiment of the present invention.

FIG. 2 is a block diagram showing an exemplary embodiment of a semiconductor device with a processor that is power managed according to the present invention. The semiconductor device 200 includes a power manager 201, a voltage and thermal sensor 202, a silicon performance monitor 203, a software memory 204, a processor 205, and a memory 206 including look-up tables 207. Appropriate values of durations of break-even times are pre-calculated and/or pre-simulated based on the different operating parameters (supply voltage, temperature, process corner). These pre-calculated and/or pre-simulated values are then stored in the memory 206 in the form of look-up tables 207. When the device 200 is booting up, the silicon performance monitor 203 identifies the process corner (ss, tt, ff) within which the processor 205 of the device 200 is currently operating. Once the silicon performance monitor 203 has identified the current process corner, the power manager initializes and applies a default value of the duration of the break-even time associated with the identified process corner. The voltage and thermal sensor 202 senses the operating supply voltage and the operating temperature associated with the processor 205 when the device 200 has booted up and a new application begins to run. The voltage and thermal sensor 202 may sense the operating supply voltage and the operating temperature every time a new application begins to run, or do the same periodically. Two or more separate sensors may be utilized to sense the operating supply voltage and the operating temperature separately.

The power manager 201 reads the sensed operating supply voltage and the operating temperature, and compares the read values to corresponding previously read values to discern if the operating supply and/or the operating temperature associated with the processor have changed. If the power manager 201 discerns that the above operating parameters have changed, then the power manager 201 searches for the appropriate value of duration of break-even time from the look-up tables 207 based on the change in the read operating parameters, and selects the appropriate value to be applied.

The silicon performance monitor 203 may be implemented in a number of different ways. For example, silicon performance monitor 203 may be implemented using a ring oscillator and a digital counter. The power manager 201 compares a digital count reported by the digital counter of the ring oscillator 203 to each of reference digital counts associated with respective process corners of the processor. Based on the results of the comparison, the power manager 201 initializes the default value, and also subsequently selects the proper look-up table within which to search for the appropriate value of the duration of the break-even time.

In this way, the power manager selects the appropriate value of the duration of the break-even time and updates the same to be applied based on the operating parameters (voltage, temperature) sensed by the sensor 202 and based on the process corner (ss, tt, ff) identified by the performance monitor 203. This dynamic updating allows the appropriate value of duration of the break-even time to be applied dynamically based on currently measured operating conditions of the processor 205. Finally, the application of the appropriate value of the duration of the break-even time optimizes the power savings by controlling the entrance of the processor 205 into the proper low power mode.

Figure 3:
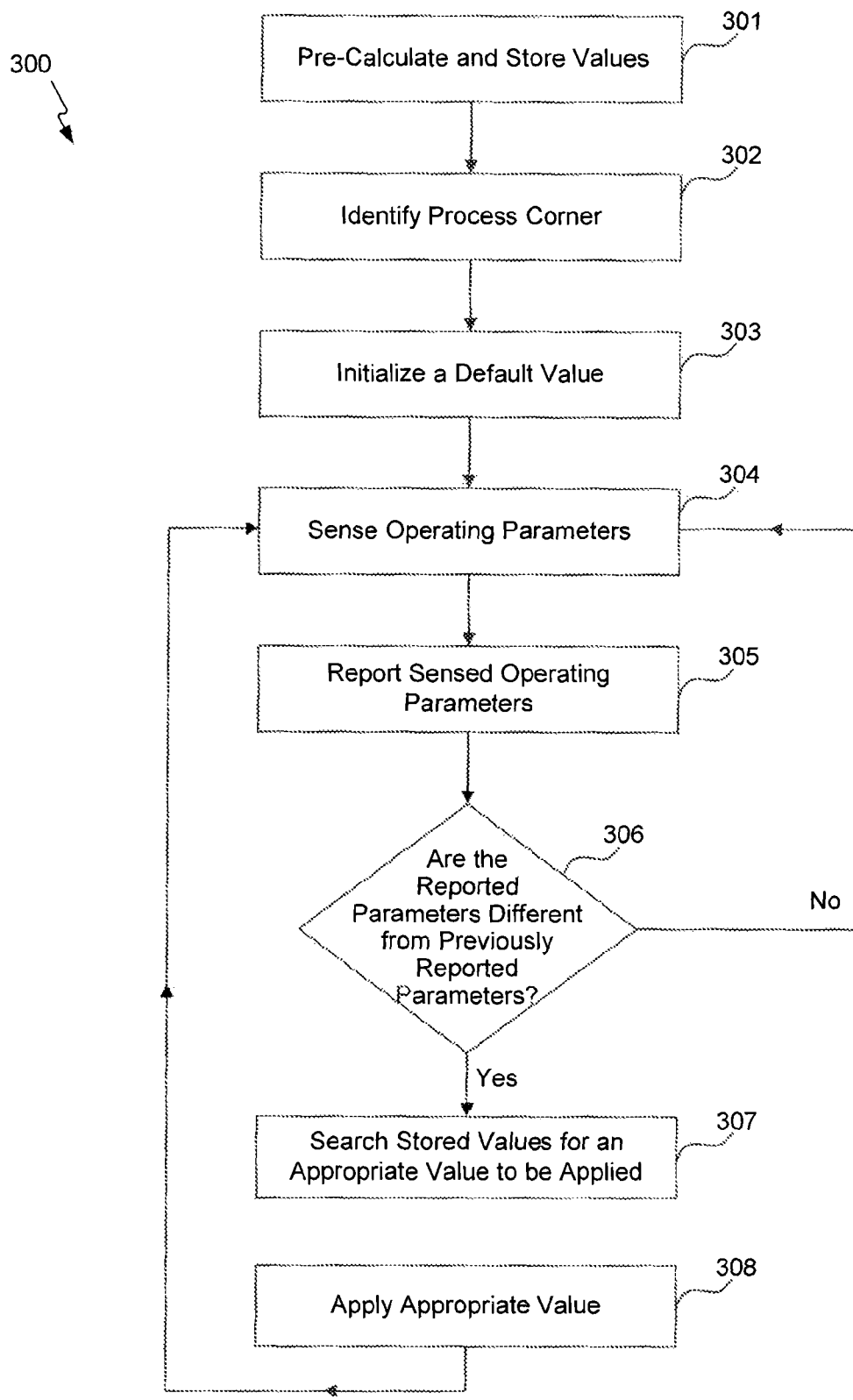
FIG. 3 illustrates an exemplary method performed by the semiconductor device according to an embodiment of the present invention.

FIG. 3 is a flowchart of an exemplary method 300 performed by the semiconductor device 200. The process starts at step 301 in which appropriate values of durations of break-even times are pre-calculated and/or pre-simulated based on the different operating parameters (supply voltage, temperature, process corner). The pre-calculated values are stored in the memory 206 in the form of look-up tables. When the device 200 is booting up, the process corner (ss, tt, ff) within which the device 200 is currently operating is identified in step 302. Once the current process monitor has been identified, a default value of the duration of the break-even time associated with the identified process corner is initialized and applied in step 303. In step 304, the operating supply voltage and the operating temperature associated with the processor 205 are sensed. These parameters may be sensed periodically or every time a new application starts to ran on the processor. Separate sensors may be used to sense the operating parameters. In step 305, the sensed operating parameters are reported to, for example, a power manager 201 of the device 200. In step 306, the reported operating parameters are compared with previously reported operating parameters to discern a difference between the same. If no difference is discerned between the compared values, then the process moves to step 304. Optionally, the process may move to step 302. However, if a difference is discerned between the compared values, then the process moves to step 307. In step 307, the stored pre-calculated values are searched, based on the discerned differences between the compared values, for an appropriate value of duration of the break-even time to be selected and applied. In step 308, the selected appropriate value is applied as the duration of the break-even time. The processor will now enter the dormant mode when the expected idle time is greater than the applied appropriate value of the break-even time. The process then moves to step 304. Optionally, the process may move to step 302.

Applicant has recognized that the leakage power is a dominant factor in total power consumed by the processor. Further, Applicant has recognized that leakage power varies in accordance with operating parameters of the processor like the supply voltage, temperature, and the process corner. The present invention enables optimization of power savings by developing a semiconductor device that can monitor and identify variations in the above operating parameters, and then adjust/update/scale the currently applied duration of the break-even time. Applying the invention described herein minimizes energy loss in the processor, thereby increasing battery lifetime.

Figures 4A, 4B:
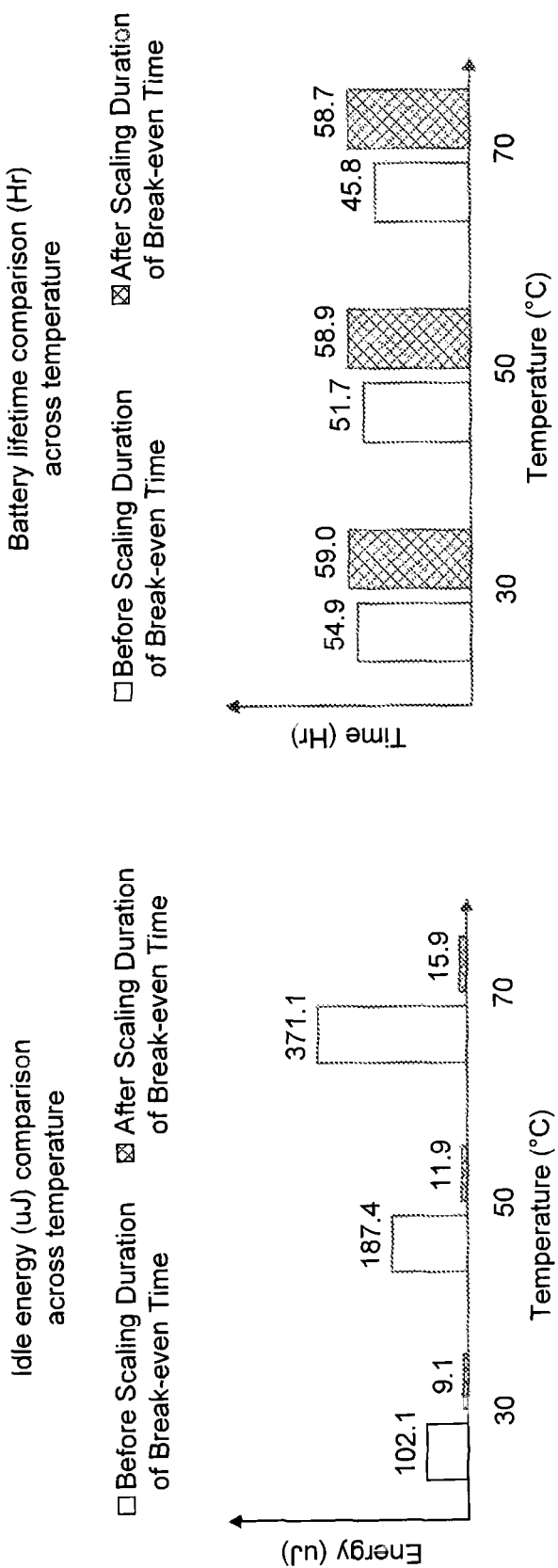
FIGS. 4A and 4B illustrate results and advantages of Applicant's scaling of the duration of the break-even time.

FIG. 4A graphically depicts a comparison between energy consumed by the semiconductor device 200 in idle state before and after implementing scaling of the applied duration of the break-even time in accordance with the invention. FIG. 4B illustrates a comparison of measured battery life times before and after implementing Applicant's scaling of the applied duration of the break-even time. One will appreciate that the idle state energy consumed by the semiconductor device has been reduced significantly, and the battery life of the battery supporting the semiconductor device 200 has been increased significantly.

In semiconductor manufacturing, a process corner refers to a variation of fabrication parameters used in applying an integrated circuit design to a semiconductor wafer. Process corners represent the extremes of these parameter variations within which a circuit that has been etched onto the wafer must function correctly. A circuit running on devices fabricated at these process corners may run slower or faster than specified and at lower or higher temperatures and voltages, but if the circuit does not function at all at any of these process extremes, the design is considered to have inadequate design margin.

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any exemplary processes described herein can be implemented in hardware, software, or any combination thereof. For instance, the exemplary process can be implemented using computer processors, computer logic, application specific integrated circuits (ASICs), digital signal processors (DSP), etc., as will be understood by one of ordinary skill in the arts based on the discussion herein.

Exemplary processes described herein can be embodied by a computer processor or any one of the hardware devices listed above. The computer program instructions cause the processor to perform the processing functions described herein. The computer program instructions (e.g., software) can be stored in a computer useable medium, computer program medium, or any storage medium that can be accessed by a computer or processor. Such media include a memory device such as a computer disk or CD ROM, or the equivalent. Accordingly, any computer storage medium having computer program code that causes a processor to perform the processing functions described herein are with the scope and spirit of the present invention.

The breadth and scope of the present invention should not be limited by any of the above-described exemplary embodiments, but should be defined only in accordance with the following claims and their equivalents.

What is claimed is:

1. A processor arrangement, comprising:
   a processor configured to enter a power saving mode based on a default time interval;
   a monitor configured to identify a process corner associated with the processor;
   a memory storing a look-up table including respective time intervals associated with a plurality of operating parameters of the processor, the look-up table corresponding to the identified process corner, wherein each respective time interval stored in the look-up table is associated with a corresponding supply voltage and a corresponding temperature of the processor;
   a sensor configured to sense a temperature of the processor; and
   a power manager configured to:
      select, based on the identified process corner and the temperature, an updated time interval from the look-up table, and
      update the default time interval based on the updated time interval.

2. The processor arrangement of claim 1, wherein the sensor is further configured to sense a supply voltage of the processor.

3. The processor arrangement of claim 1, wherein the memory stores a plurality of look-up tables.

4. The processor arrangement of claim 3, wherein each look-up table in the plurality of look-up tables corresponds to a different potential process corner of a plurality of potential processor corners.

5. The processor arrangement of claim 1, wherein the power manager is further configured to:
   compare the temperature to a previously sensed temperature, and update the default time interval based on a result of the comparison.

6. A method, comprising:
identifying a process corner associated with a processor;
determining, during a first execution of a first application by the processor, a default time interval for the processor to enter into a power saving mode based on the process corner;
detecting a second execution of a second application by the processor;
detecting a change in temperature of the processor after detecting the second execution of the second application;
reading an updated default time interval from a look-up table corresponding to the process corner, wherein the look-up table includes respective time intervals associated with a plurality of operating parameters of the processor, and wherein each respective time interval stored in the look-up table is associated with a corresponding supply voltage and a corresponding temperature of the processor; and
updating the default time interval based on the updated default time interval.

7. The method of claim 6, further comprising:
detecting a change in supply voltage of the processor.

8. The method of claim 7, further comprising:
updating the default time interval based on the change in supply voltage.

9. The method of claim 6, further comprising:
selecting the look-up table from a plurality of look-up tables.

10. The method of claim 9, wherein each look-up table in the plurality of look-up tables corresponds to a different potential process corner of a plurality of potential process corners associated with the processor.

11. An apparatus, comprising:
a processor configured to enter a low power mode based on a time interval;
a memory storing a look-up table including respective durations of time associated with a plurality of operating parameters of the processor, wherein each respective duration of time stored in the look-up table is associated with a corresponding supply voltage and a corresponding temperature of the processor; and
a power manager coupled to the processor, wherein the power manager is configured to:
determine a process corner, within which the processor is operating, wherein the look-up table corresponds to the process corner,
determine a current operating condition of the processor,
select, based on the process corner and the current operating condition, a first duration of time from the look-up table, wherein the first duration of time is a duration of idle time to elapse before the processor enters the low power mode, and
update the time interval based on the first duration of time.

12. The apparatus of claim 11, wherein the current operating condition is a current temperature of the processor.

13. The apparatus of claim 11, wherein the current operating condition is a current supply voltage of the processor.

14. The apparatus of claim 11, wherein the power manager is further configured to:
determine a current temperature of the processor;
determine a current supply voltage of the processor; and
update time interval based on the current temperature, current supply voltage, and the process corner.

15. The apparatus of claim 11, wherein the low power mode is a dormant mode.

16. The apparatus of claim 11, further comprising:
a sensor configured to sense the current operating condition.

17. The apparatus of claim 11, further comprising:
a silicon performance monitor configured to identify the process corner, wherein the process corner is slow, typical, or fast.

18. The apparatus of claim 17, wherein the power manager is further configured to:
compare a reported count generated by the silicon performance monitor to a reference count associated with the process corner; and
select the first duration of time based on the reported count.

19. An apparatus, comprising:
a processor configured to enter a low power mode after a duration of idle time; and
a memory storing a plurality of look-up tables, each look-up table corresponding to a different potential process corner associated with the processor, and each look-up table having a plurality of durations of idle time indexed to corresponding operating conditions; and
a power manager coupled to the processor and the memory, wherein the power manager is configured to:
determine an actual process corner for the processor from the plurality of potential process corners,
determine a first operating condition of the processor,
select a first look-up table from the plurality of look-up tables based on the actual process corner determined for the processor, and
select the duration of idle time for the processor to enter the low power mode from the plurality of durations of idle time in the selected first look-up table based on the first operating condition.

20. The apparatus of claim 19, wherein the power manager is further configured to:
determine the first operating condition of the processor during a first execution of a first application by the processor;
detect a second execution of a second application by the processor;
determine a second operating condition of the processor during the second execution of the second application;
select a second look-up table from the plurality of look-up tables based on a difference between the first operating condition and the second operating condition; and
update the duration of idle time based on the selected second look-up table.

* * * * *